F. GOFF.
RELIEF VALVE.
APPLICATION FILED OCT. 1, 1917.
1,305,597.
Patented June 3, 1919.
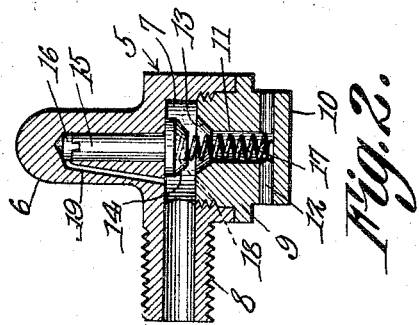
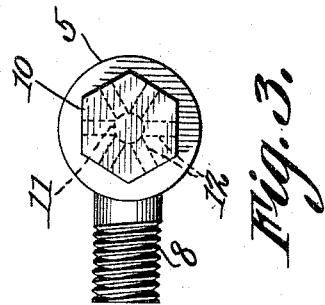
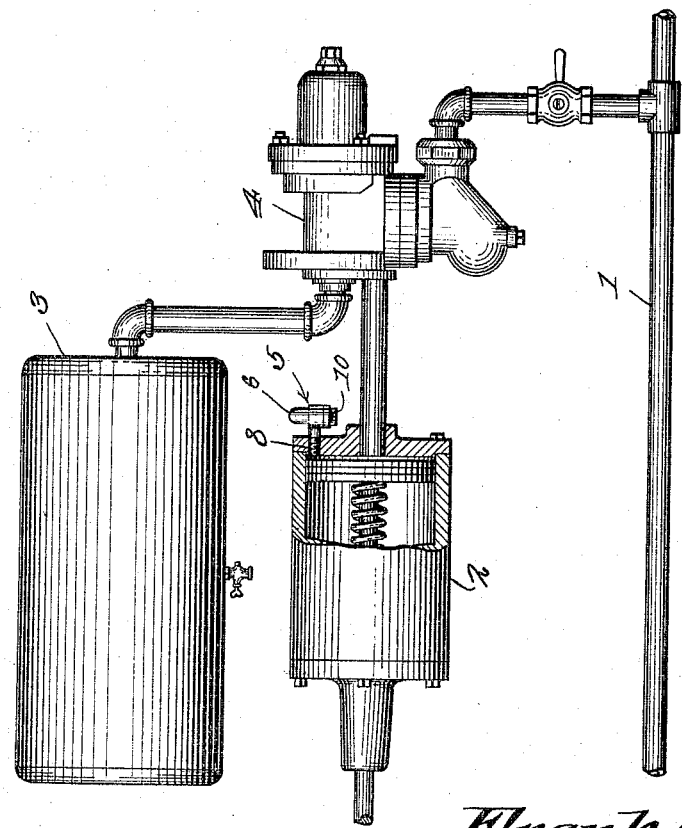
Frank Goff
Inventor,
Witness
By C.A. Snow & Co.
Attorneys.

UNITED STATES PATENT OFFICE.

FRANK GOFF, OF COLLINGSWOOD, NEW JERSEY.

RELIEF-VALVE.

1,305,597.   Specification of Letters Patent.   Patented June 3, 1919.

Application filed October 1, 1917. Serial No. 194,234.

*To all whom it may concern:*

Be it known that I, FRANK GOFF, a citizen of the United States, residing at Collingswood, in the county of Camden and State of New Jersey, have invented a new and useful Relief-Valve, of which the following is a specification.

The present invention appertains to relief valves, and aims to provide novel and especially useful means for preventing the accumulation of undesired pressure in the brake cylinder, a condition which is generally due to overcharged or leaky brake pipe, defective feed valve, brake valve being in lap position, or from any cause whatsoever, although the device can be used on various objects to let air, water or other fluid escape under atmospheric or low pressure only.

It is a very common occurrence for the brakes of trains to creep on, especially with long trains, and this reduces the capacity of the locomotive, causes detention, increases the consumption of fuel, and also increases the wear and tear on brake shoes and other equipment. With the provision of the present invention any leakage into the brake cylinder, for any cause whatever, will escape to the atmosphere, thereby avoiding the accumulation of undesired pressure, but preventing such escape or release of the pressure fluid when the brakes are applied automatically.

It is also the object of the invention to provide an appliance of the nature indicated which is inexpensive and simple in construction, automatic in action, requiring very little or no attention, and which can be easily and quickly attached to the ordinary air brake equipment or other objects.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is an elevation of a unit of the ordinary air brake equipment, showing the relief valve applied thereto.

Fig. 2 is an enlarged diametrical section of the relief valve, portions being shown in elevation.

Fig. 3 is a plan view of the valve.

The air brake equipment illustrated embodies the usual train or brake pipe 1, brake cylinder 2, reservoir 3 and triple valve 4 operable for the normal flow of pressure fluid from the brake pipe into the reservoir and the escape of pressure fluid from the brake cylinder to the atmosphere to release the brakes, and operable, in the event of reduced pressure in the pipe 1, to establish the flow of pressure fluid from the reservoir 3 into the brake cylinder to apply the brakes.

The relief valve 5, forming the subject matter of this invention, is attached either to the brake cylinder 2 directly or indirectly thereto, so long as it is in communication with the brake cylinder. The function of this valve is to relieve pressure in the brake cylinder due to leakage thereinto for any cause whatever, and to retain the pressure fluid in the brake cylinder when essential to apply the brakes.

The construction of the relief valve 5 is shown in Figs. 2 and 3, the valve having a body 6 of suitable metal provided at one end with a recess or cavity 7, and at one side with an outstanding nipple 8 communicating with said recess and providing an inlet for the valve body or casing 6. This nipple 8 is threaded for attachment to the brake cylinder or to a pipe communicating with said brake cylinder, affording quick attachment of the valve to the ordinary air brake equipment. A cap or plug 9 is threaded within the recess 7 or otherwise attached to the recessed end of the body 6, and is provided with an outstanding wrench-engaging boss 10 of hexagonal or other suitable outline. The cap 9 has a central axial port 11 therein extending from its inner face into but not through the boss 10, and the outer end of said port has branches 12 extending radially to the various sides of the boss 10. The cap 9 is further provided with a conical or beveled valve seat 13 at the inner end of the port 11 to accommodate a conical or beveled valve head 14 movable within the chamber or recess 7 between the cap 9 and bottom of said recess. The head 14 has a stem 15 projecting away from the cap 9 and slidable loosely within a bore 16 in the body 6 extending from the recess 7. A retarding or restraining spring 17 of coiled form is disposed within the port 11 and confined between the cap and valve head, the outer end of the spring seating against the boss 10 of the cap at the outer end of the port 11 and the inner end of the spring seating within a recess 18 in the valve head, to hold the spring in place. The spring 17 is of such tension that it will hold the valve head from its seat when there is a low pressure flow of fluid through the valve from the nipple 8 to the port 11, but permitting the valve head to be drawn or sucked against the seat 13 when the volume and pressure of the flow is increased above a predetermined amount. Thus, no matter in which position the body 6 is arranged, the spring 17 will normally move the valve head 14 away from the seat 13, thereby opening the port 11, and consequently, any leakage of air into the brake cylinder 2 can pass out through the nipple 8, recess 7 and port 11 to the atmosphere, preventing an undesired accumulation of pressure in the brake cylinder, which not infrequently causes the brakes to creep on. When the brakes are applied in the usual manner, however, the volume and pressure of fluid increases and in rushing through the relief port 11 and behind the head 14 and stem 15, exerts both a pushing and suction effect on the valve head 14, thereby overcoming the resistance of the spring 17 and seating the valve head. This will retain the pressure fluid in the brake cylinder, and when the valve head 14 is once seated, it is readily held in closed position by the pressure against it from within the brake cylinder. When the brakes are released, the pressure reduction, enables the spring 17 to again assert itself and unseat the valve head or member permitting the pressure fluid to escape. The spring 17 holds the valve head open at any position of the relief valve, and also prevents premature closing of said valve head, the spring aiding the prompt opening of the valve when the brake cylinder pressure is released. The loose play of the stem 15 in the bore 16 will prevent the valve head from sticking, but, when desired, a bypass or port 19 can be provided in the body 6 extending from the recess 7 to the closed end of the bore 16 and establishing communication between said bore behind the stem 15 and the nipple 8. Thus, the pressure against the valve head or member will be equalized, and the pressure fluid in flowing through the bypass 19 will facilitate the seating of the valve member. This bypass or port 19 can be eliminated in most instances, however, but may be essential in some cases.

It is preferable to have the valve arranged with the cap 9 lowermost, so that the valve head 14 tends to seat by gravity, being supported above the seat by the spring. This will render the valve more sensitive, to assure of the closure thereof, when the pressure of the fluid flowing therethrough reaches the predetermined amount. Furthermore, in this position of the valve, the port 11 and its branches 12 open downwardly, so that any dust, moisture or other extraneous matter will drain from the valve, to prevent the clogging thereof or accumulation of foreign matter therein.

Having thus described the invention, what is claimed as new is:

1. A relief valve comprising a body having a guide, a relief port opposite to and in alinement with said guide and opening into the atmosphere, a recess between said guide and port, and a passage leading to said recess for the escape of air through said port, and a valve member slidable in the guide to move within the recess and close said port when the pressure of the escaping air increases to a predetermined amount, and normally movable away from said port.

2. A relief valve comprising a body having a recess, a guide extending from the recess, and a passage leading to said recess, a cap for said recess, having a relief port and a valve seat, and a valve member movable in the guide to project into the recess and seat against said seat, and normally movable away from said cap.

3. A relief valve comprising a body having a recess, a bore extending from the recess, a relief port leading from the recess opposite to the bore, a passage leading to one side of the recess, and a by-pass leading from said passage to that end of the bore farthest from the recess, and a valve head movable in the recess to close said port and having a reduced stem slidable in said bore.

4. A relief valve comprising a body having a recess at one end, a bore extending from said recess and an outstanding nipple at one side communicating with said recess, a cap attached to said end of the body and having a relief port and a valve seat at the inner end of said port, a valve head movable in the recess and having a stem movable in said bore, said valve head being movable against the seat by a suction and pressure of the fluid flowing through the relief port, and a retarding spring confined between said head and cap.

In testimony that I claim the foregoing as my own, I have hereto affixed my signature in the presence of two witnesses.

FRANK GOFF.

Witnesses:
HOWARD E. GOFF,
CHARLES ACKLEY.